(12) United States Patent
Graf

(10) Patent No.: US 7,827,739 B2
(45) Date of Patent: Nov. 9, 2010

(54) WIND FLOW BODY FOR A STRUCTURE

(75) Inventor: Christoph Graf, Schneisingen/AG (CH)

(73) Assignee: SkyBus, Ltd. (CH)

( * ) Notice: Subject to any disclaimer, the term of this patent is extended or adjusted under 35 U.S.C. 154(b) by 1051 days.

(21) Appl. No.: 11/543,562

(22) Filed: Oct. 4, 2006

(65) Prior Publication Data

US 2008/0083171 A1    Apr. 10, 2008

(51) Int. Cl.
*E04B 1/00*    (2006.01)
(52) U.S. Cl. .................................... 52/84; 52/173.1
(58) Field of Classification Search ............... 52/29, 52/84, 173.1
See application file for complete search history.

(56) References Cited

U.S. PATENT DOCUMENTS 2,270,537 A * 1/1942 Ludington ................. 52/173.1
3,866,363 A * 2/1975 King ........................... 52/29
4,461,129 A * 7/1984 von Platen ................. 52/173.1
6,601,348 B2 * 8/2003 Banks et al. ................ 52/25

* cited by examiner

Primary Examiner—Richard E Chilcot, Jr.
Assistant Examiner—Matthew J Smith
(74) Attorney, Agent, or Firm—McCormick, Paulding & Huber LLP

(57) ABSTRACT

The present invention provides wind flow bodies for use with a structure for decreasing the carrier wing effect on the structure by the formation of turbulence or reducing the dynamic pressure by deflecting the wind flow. The invention further provides a method for securing the composition of a structure against the onslaught of heavy winds, whereby zones, which are suitable for the formation of a critical carrier wing effect during heavy wind flow are identified on the structure, and the position of a wind flow body for generating turbulence for dampening the carrier wing effect, is then determined. Further zones are identified which are suitable for the formation of the dynamic pressure, and the operating position of a wind flow body is then determined for deflecting the corresponding wind flow for reducing the dynamic pressure.

26 Claims, 7 Drawing Sheets

WIND FLOW BODY FOR A STRUCTURE

FIELD OF THE INVENTION

The present invention generally pertains to a wind flow body for use with a structure and more particularly to a wind flow body positionable relative to a structure for changing the wind flow forces affecting the structure and method of use thereof.

BACKGROUND OF THE INVENTION

Heavy winds, such as storm winds, hurricanes or typhoons (which are named differently, depending on the region, but which can always reach considerable strength) routinely lead to considerable damages on structures of all types, particularly homes. It is thereby unpredictable, whether a structure will be affected only slightly or heavily. Storm damages extend from possibly damaging individual windows or the loss of a few roof tiles or purlins to the complete destruction of the structure or the home. Likewise, a rather mild storm can cause larger damages or a very heavy storm can cause comparatively small damages.

Simpler constructions, such as wooden homes or even transportable prefabricated homes with considerable amounts of plastic generally have only low resistance against the destructive onslaught of storms. However, even massive structures made of stone can be damaged by storms, in particular in the area of the roof. For example in the hurricane belt on the East coast of the U.S. to Mexico, the corresponding yearly losses add up to amounts, which can easily exceed a billion US dollars.

A certain protection of structures against the onslaught of heavy winds can be achieved in that doors and windows are lagged and, for example, light wooden walls are reinforced (for example, JP7247770). Another way leads to a specifically more massive construction of endangered parts of the structure. In particular, in the above-mentioned hurricane belt, however, or in the typhoon regions of Asia, it is a tradition to build lightweight homes, so that the effect of these preventative measures remains low and that the necessity for protection is still high.

It is also proposed to provide specific protective devices for the residents (U.S. 2005 262795), whereby it is presumed, however, that the inhabited building will most likely not be able to withstand the onslaught of the storm.

It is now the object of the instant invention to provide a means, which additionally also better protects the structures from damages caused by heavy winds, or which increases their resilience to storms.

SUMMARY OF THE INVENTION

The present invention provides a wind flow body for changing heavy wind flow affecting a structure, characterized by a windward region, a leeward region, and a positioning device for removably fixing the wind flow body in an operating position relative to a structure. The wind flow body is embodied in such a manner that a heavy wind flow directed from the windward region to the leeward region is changed in a predetermined manner such that wind flow forces affecting at least a part of the structure are changed.

In another aspect of the invention, a structure including a wind flow body attached thereto is provided.

Additionally, the present invention provides a method for securing the composition of a structure against the onslaught of heavy winds, whereby zones, which are suitable for the formation of a critical carrier wing effect during heavy wind flow, are identified on the structure, and the operating position of a wind flow body for generating the turbulence, which dampens the carrier wing effect in a respective zone, is then determined. The method also includes identifying further zones on the structure which are suitable for the formation of dynamic pressure, which is critical during heavy wind flow, and the operating position of a wind flow body for the predetermined deflection of the corresponding wind flow, so that the dynamic pressure is reduced.

The destruction force of heavy winds is, firstly, based on the fact that the dynamic pressure of the wind flow directed against the walls of structures can reach considerable amounts, so that their structure is strained up to the stability limit or beyond. Furthermore, it often occurs that windows are pushed in by the wind. Consequently, the pressure on the interior of the structure increased by the dynamic pressure of the entering storm wind and thus destabilizes the fit of the roof (which is often firmly seated on the structure, essentially due to its own weight).

Particularly with a gabled roof, the danger is high that a carrier wing effect is formed during an essentially horizontally blowing storm wind (see thereto the description regarding FIG. 1), which exercises a upward suction. However, this is also possible with roofs, which have grades or which are provided with spires. Even with flat roofs, a carrier wing effect can arise, for example, when a slightly obliquely directed squall blows against and across the edge of the roof.

Practically, every structure has different zones, be it in the roof region or not, in which considerable carrier wing effects or dynamic pressures, which are caused by heavy winds, can form.

In a disadvantageous case, the destabilizing effect of inner overpressure (for example dynamic pressure in case of the broken window) and carrier wing effect accumulate, which can lead to a rapid destruction of the roof. Individual roof regions can thus be lifted and, due to their now changed position, be grabbed completely and torn away due to the impact of the storm. The remaining roof will then not be able to resist the storm for a long period.

Due to the fact that now the heavy wind flow is changed in a predetermined manner by the wind flow body according to the invention, the otherwise inevitable carrier wing effect is significantly reduced. Consequently, a crucial part of the destructive wind onslaught forces is dispensed with, and a roof is thus less strained with the same wind flow.

Likewise, the dynamic pressure on the walls of structures can be reduced with the wind flow body according to the invention, because the wind flow, which otherwise fully hits the wall, is changed in a predetermined manner. Consequently, the otherwise destructive dynamic pressure assumes significantly smaller values. Windows and walls remain undamaged. The increase of the inner pressure of the structure is dispensed with, the roof remains stable.

The invention will be explained in more detail below by means of the attached figures.

DETAILED DESCRIPTION OF THE INVENTION

Figure 1:
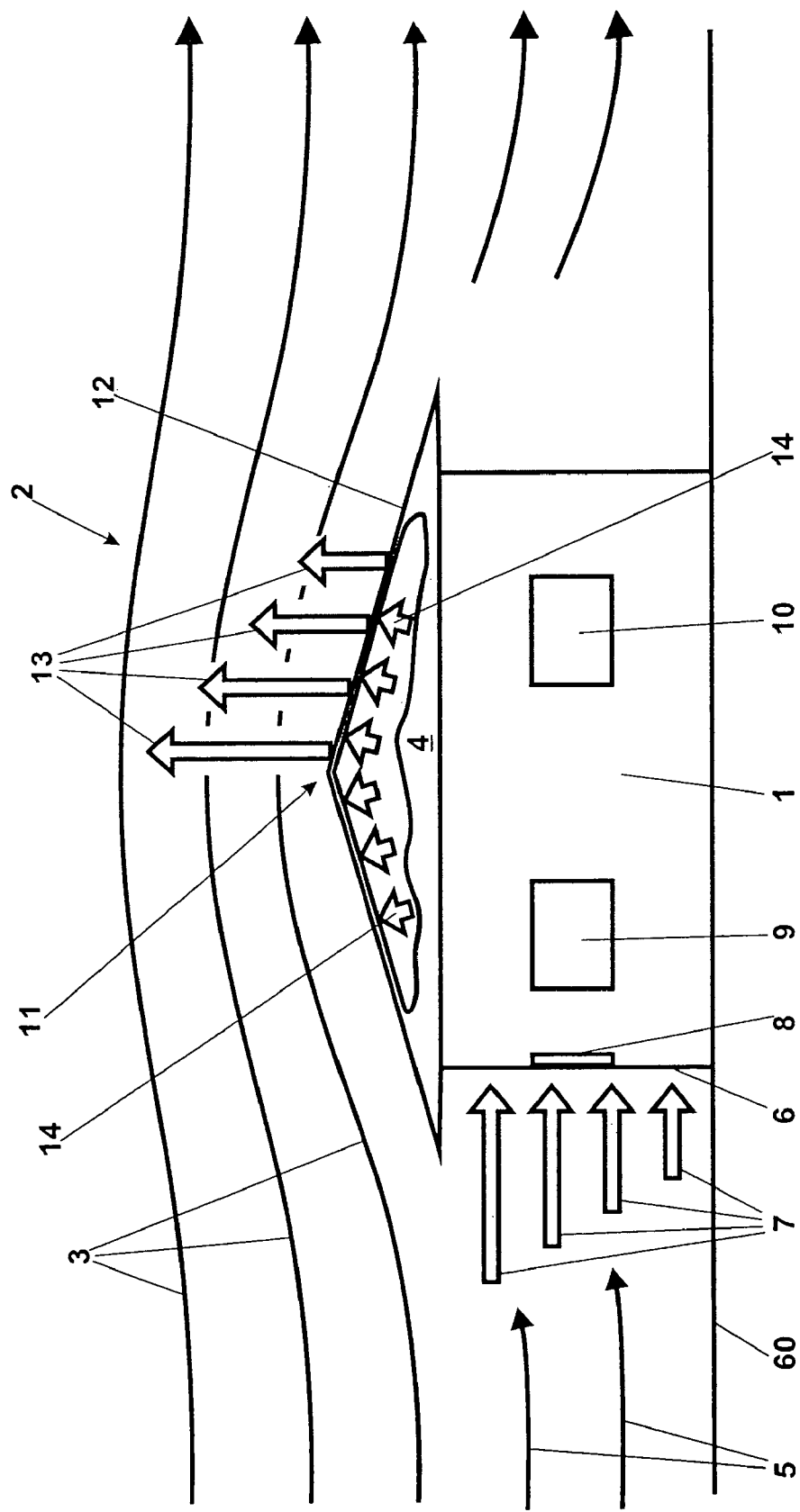
FIG. 1 is a schematic drawing illustrating the effect of a heavy wind on a home.

FIG. 1 shows a structure, here a home 1, exposed to a heavy wind 2 or storm, such as, for example, a hurricane. Flow paths 3 of the wind 2 are illustrated, which essentially extend across the roof 4 of the home 1, while flow paths 5 of the wind 2 are directed against a wall 6.

The wind force acting on the wall 6 due to the wind portion corresponding to the flow paths 5 is illustrated by the force vectors 7. Corresponding to the boundary layer, which allows only low wind speeds in the immediately vicinity of the ground level, the force vectors 7 increase with increasing distance to the support 60, until they finally correspond to the force of the freely blowing storm, for example at the height of the roof 4.

Windows 8, 9, 10 are further illustrated, whereby in the instant example, the window 8 is directly subjected to the dynamic pressure of the wind 2 represented by the vectors 7.

The storm, corresponding to the flow paths 3, blowing across the roof creates an underpressure of the type of the carrier wing effect in the region of the ridging 11 and particularly on the roof side 12 located downstream. The force components acting vertically upward on the roof are illustrated by the force vectors 13 and develop due to the normal inner pressure prevailing in the home 1, which is now greater as compared to the outside of the roof.

The carrier wing effect develops because air particles flowing across the roof 4 must flow across the ridging 11 in an arch corresponding to the flow paths 3, and thus cover a detour as compared to the horizontal (direct) path according to the direction of the flow paths 5. This leads to an increase of the speed of the wind portion flowing across the roof 4, which, in turn, leads to an underpressure according to Bernoulli's equation in this wind portion.

At hand, the term "carrier wing effect" is to include any underpressure developing locally at the building, which is caused by the air flowing around the building in the above-described sense.

Should the storm push in the window 8, the dynamic pressure symbolized by the force vectors 7 increases the inner pressure in the home 1. The roof 4 is then additionally pushed away from the home according to the force vectors 14 (which can be seen in the figure in the cut open roof 4).

Typically, roofs are not specifically anchored at the walls of a home, because they firmly bear on the walls, simply due to their own weight. During a heavy storm, the carrier wing effect is suitable to dangerously strain a roof constructed according to standard norms in such a manner that storm squalls can lift or rip open the roof. When a window breaks, the roof additionally destabilizes, as described above, which generally leads to its destruction.

As already mentioned, almost all roof forms can lead to a dangerous carrier wing effect, because, depending on the wind direction, the junction between a wall and the roof or a grading in the roof can lead to a flow, which creates an underpressure.

Figure 2A:
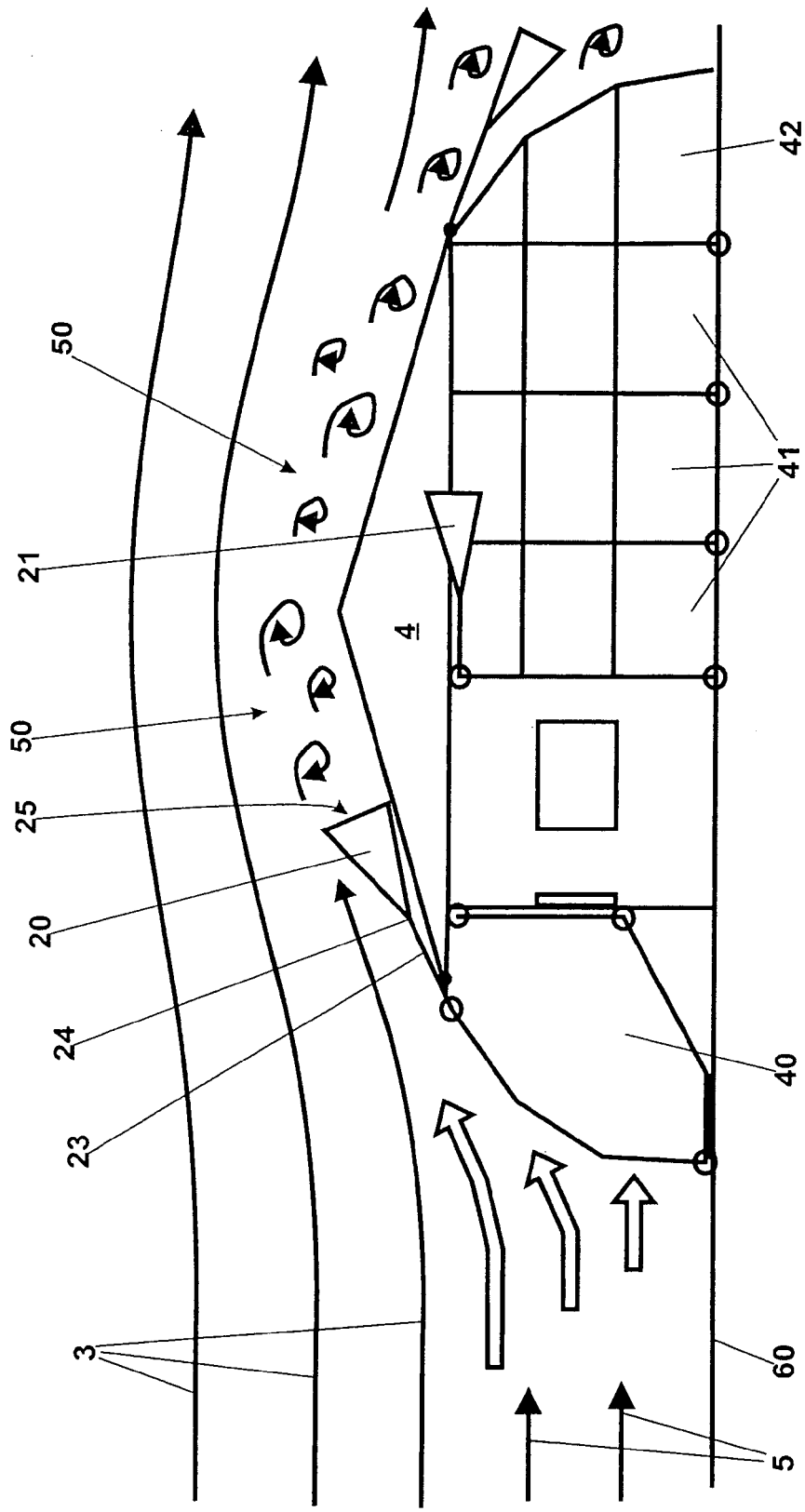
FIG. 2a is a schematic drawing illustrating the home of FIG. 1 subject to the same heavy wind and equipped with various wind flow bodies in accordance with the present invention.

FIG. 2a shows the home 1 of FIG. 1, which is equipped with wind flow bodies according to the invention:

Wind flow bodies 20, 21, and 22, as well as wind flow bodies 40, 41, and 42 are arranged at the home 1.

The wind flow body 20 is fastened on a rope 23 in a freely movable manner. This rope, in turn, is stationary relative to the roof 4, but is anchored in a detachable manner. The storm wind blowing along the flow paths 3 grips the wind flow body 20, which then lies in the wind in the manner of a vane, and which is carried by the storm wind. A windward region 24 of the body 20 faces the wind, a leeward region 25 faces away from the wind.

The windward region 25 is embodied in such a manner that it changes the laminar flow of the wind portion blowing across the roof 4 in a predetermined manner and thus creates a region 50 of turbulences, which expands downstream behind it. Thanks to the other flow ratios, the conditions for an underpressure in the wind flow are no longer given in the turbulent flow of the region 50, so that the damaging effect of the wind flow forces on the roof 4 changes, thus being crucially eased, or completely fall away.

The wind flow bodies 21 and 22 are fixed relative to the home 1 in the same manner as the body 20, and thus lie freely movable in the local flow direction of the wind. The turbulent flow regions created therewith are not illustrated for unburdening the figure.

Figure 2B:
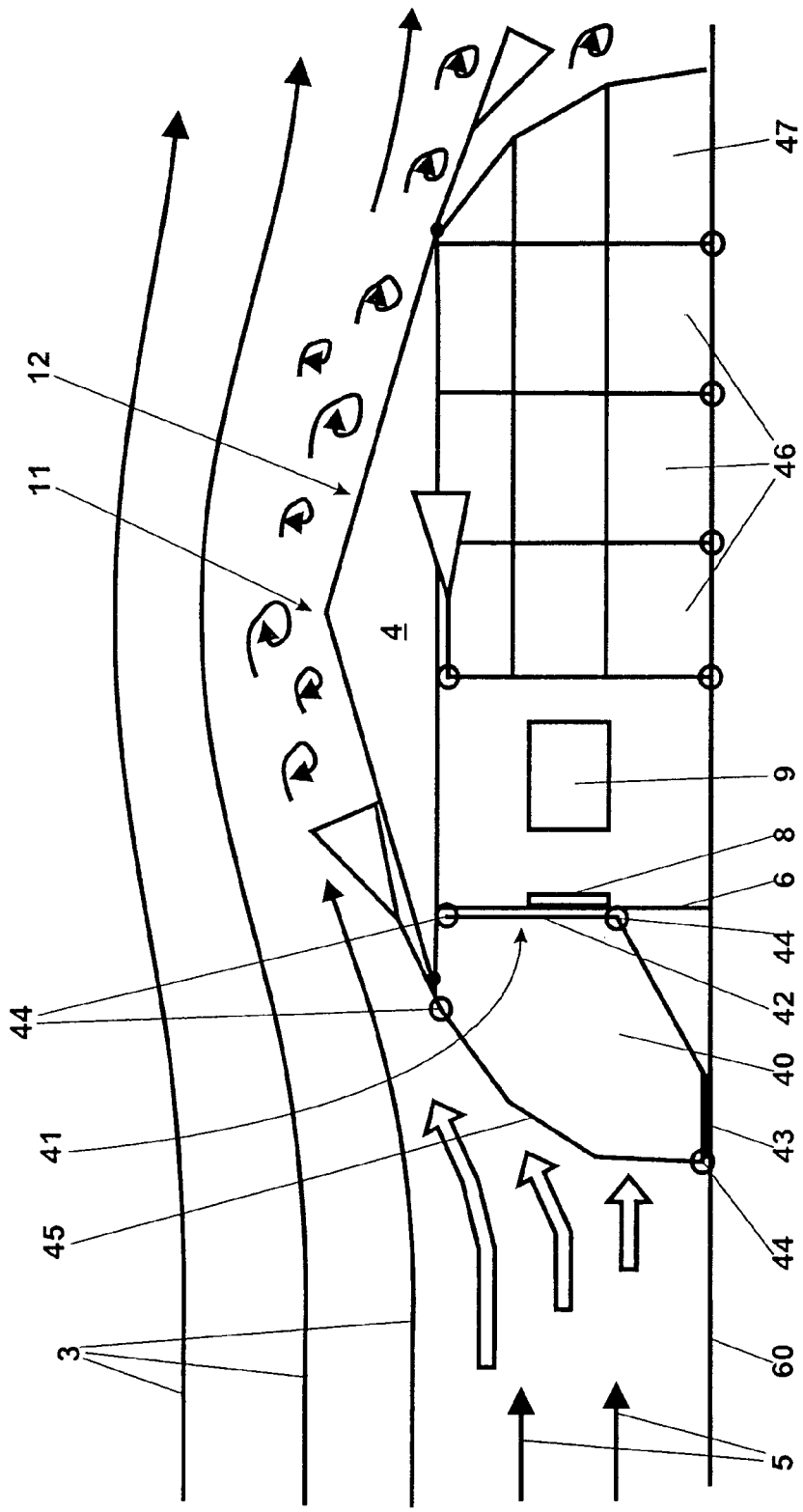
FIG. 2b is another schematic drawing of the home of FIG. 2a identifying further details of the wind flow bodies of the present invention.

FIG. 2b shows the wind flow body 40, which is fastened to the wall 6 with a leeward region 41 via a surface area 42, whereby the surface area 42 covers the window 8. The body 40 is supported on the support, here the bottom 60, with a contact surface 43. The wind flow body 40 is fixed to the wall 6 as well as to the bottom 60 via a positioning device, which has anchor points 44.

A windward region 45 of the wind flow body 40 is subjected to the wind flow characterized by the flow paths 5. Due to the shaping of the windward region 45, the wind hitting the windward region 45 is diverted and deflected upward in a predetermined manner according to the arrows in the figure. The wind force components directed against the wall 6, transferred via the wind flow body 40, thus reach only a fraction of the values of the dynamic pressure, as it prevails in the case of the wind directly colliding against the wall 6 (see FIG. 1). Due to the fact that the surface area 42 covers the window 8, it is ensured, among other things, that the transferred wind force components are essentially not lead into the window 8, but into the wall 6.

The wind flow body 40 is illustrated in the figure in a side view. The wind flow bodies 41 of same construction face the observer with their windward region 46. A further body 47 is embodied as a corner element, but otherwise does not differ from the construction of the bodies 40, 41.

The wind portion characterized by the flow paths 5 is largely diverted through the windward region 45 of the wind flow body 40 against the roof 4 and flows with the wind portion characterized by the flow paths 3 via the ridging 11 against the opposite roof side 12. In a disadvantageous case, the carrier wing effect thus increases accordingly. Depending on the concrete embodiment of a roof, it may thus be inevitable to use wind flow bodies 20, 21, and 22, which are coordinated therewith, at the same time, when using wind flow bodies 40, 41, and 47.

Vice versa, depending on the given structure, only the use of wind flow bodies 20, 21, and 22 can be designated.

Heavy wind, flowing from the windward region to the leeward region, flows all-around the wind flow bodies of the type of the bodies 20, 21, and 22. They serve the purpose of changing the wind flow in a predetermined manner, here to create turbulence downstream.

Wind flow bodies of the type of the bodies 40, 46, and 47 are embodied to change the wind flow through the windward region, in a suitable predetermined manner; the leeward region 41 thereof at least partially faces a region of the structure and preferably abuts thereon. As a result, wind directed against the leeward region 41, consequently against a part of the structure, is diverted and deflected from the said part of the structure, so that the dynamic pressure, which otherwise bears on this part, is reduced considerably.

Preferably, both types of wind flow bodies 20, 21, 22 and 40, 46, 47 are adjusted to the building, which is to be protected, in such a manner that zones are localized on the structure, on which a critical carrier wing effect or dynamic pressure will presumably occur when heavy winds attack. Then, an advantageous operating position of the wind flow bodies can be determined and their outer form can also be optimized. In particular, in the context of the professional configuration of the flow bodies for an individual structure, the mutual cooperation of both types of wind flow bodies can be optimized, as is indicated above in an exemplary manner. The person of skill in the art is thus able to maximize the use of the wind flow bodies for a concrete building form in consideration of the wind squalls occurring in variable strength and in variable direction in its entire effect. As a result, a presently not yet achieved level of safety for buildings and inhabitants can be achieved for the inhabitants by combining the wind flow bodies according to the invention, with means according to the state of the art, such as, for example, the initially-mentioned specific protective devices.

FIGS. 3a to 3e show different embodiments of the wind flow body 20, around which air flows. All embodiments can be fixed via a positioning device relative to the structure, which has a fastening member, preferably a flexible tension member, which is embodied as a rope 60 in the figures. All of the embodiments have a windward region 61 and a leeward region 62. The rope 60 is fixed to the windward region 61.

Figure 3A:
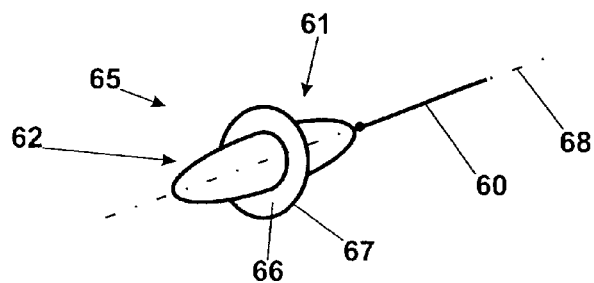
FIGS. 3a to 3e are perspective views of exemplary embodiments of wind flow bodies according to the present invention.

In the embodiment of FIG. 3a, the illustrated wind flow body 65 has a rotational-symmetrical profile, whereby a revolving spoiler lip 66 embodies a stalling edge 67, which leads to the flow stalling and thus to the turbulence of a heavy wind flow downstream behind the windward region 62. The axis of symmetry 68 extends from the windward region 61 to the leeward region 62.

Figure 3B:
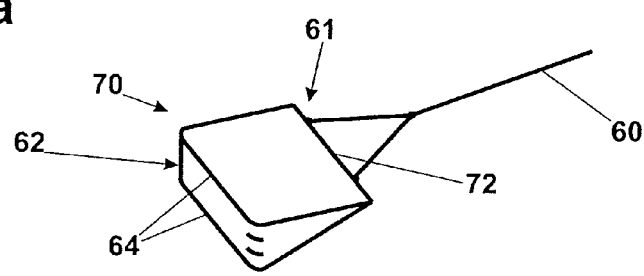

In the embodiment of FIG. 3b, the illustrated wind flow body 70 is wedge-shaped with the windward region 61 on the tip of the wedge 72. Stalling edges 64 create turbulence.

Figure 3C:
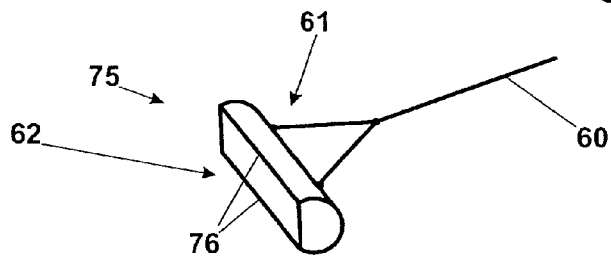

In the embodiment of FIG. 3c, the illustrated wind flow body 75 is bar-shaped, whereby it is located diagonally to the wind direction during operation. A stalling edge 76 creates turbulence.

Figure 3D:
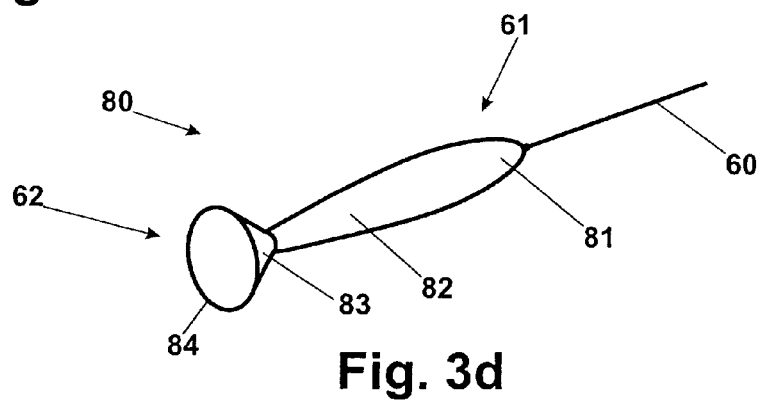

In the embodiment of FIG. 3d, the illustrated wind flow body 80 is torpedo-shaped. The rope 60 engages on the head 81 of the torpedo, which tapers towards its tail 82, whereby the end 83 of the tail 82 expands again in such a manner that a revolving stalling edge 84 is formed.

In particular the wind flow bodies 70 and 80 (FIGS. 3b and 3d) are elongated in the wind flow direction (i.e. viewed from the respective windward region 61 to the leeward region 62), in order to stabilize their position in the wind flow which flows around them. Furthermore, they are embodied with the lowest possible flow at the windward side, with the advantage that the position stability, in turn, is improved. Furthermore, an optimized flow resistance causes such wind flow bodies to be less heavily thrown around, in particular in storm squalls, and then less heavily collide with the roof 4.

Ultimately, collisions with the roof 4 or other parts of a structure may well be inevitable in the storm, so that, in a further preferred embodiment, soft materials, which are deformable during impact, are preferred for the production of the wind flow bodies of said type.

The wind flow bodies 65 and 75 (FIGS. 3a and 3c) have a form, which can be predetermined by the structure to be protected, for example, when turbulence is to be created in recesses or between roof superstructures.

Depending on the anticipated flow ratios, it may be in order to provide a wind flow body according to any of FIGS. 2 to 6 with forms, such as additional stalling edges, protrusions, etc., so that the formation of turbulence is suitably intensified.

Figure 3E:
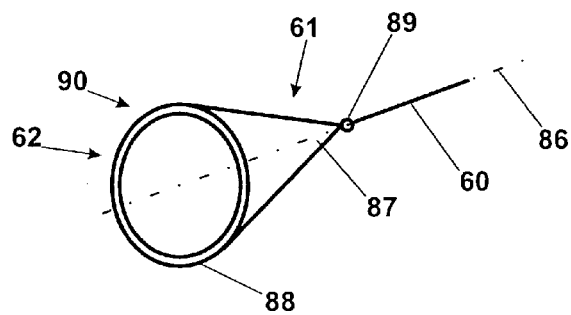

In the embodiment of FIG. 3e, the illustrated wind flow body 90 is cone-shaped with a rotation symmetry axis 86 and has a windward region 61 on its pointed end 87. A revolving stalling edge 88 arranged at the opposite leeward region 62 creates turbulence in the wind lengthwise flowing around the body 85. The body 85 is hollow and is embodied in the region of the basic surface of the cone without a closing wall, which, in case of the collision with parts of the structure, can impart a certain resilience, such as, for example, when the body 90 consists of an elastic material (plastic). A rope 60 belonging to the positioning device is arranged at the body 85 via a ring 89 and serves the purpose of keeping it in an operating position relative to the structure.

Figure 4A:
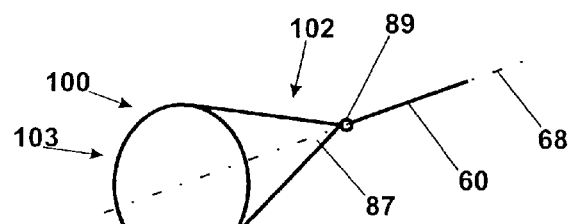
FIGS. 4a to 4c are perspective views of preferred embodiments of a wind flow body in accordance with the present invention.

FIG. 4a also shows a wind flow body 100 with a cone-shape, which, however, is embodied in an inflatable manner according to a particularly preferred embodiment. Its walls consist of flexible, gas-tight material, so that it can be folded together for storage and inflated for operation.

Storage in folded together condition means that the storage can take place in the building itself, which is to be protected, which is otherwise practically hardly the case, but which must arguably often be classified as being crucial for the timely availability at the building.

Production from flexible, gas-tight material furthermore means that the weight of the body remains small enough, even with a solid, storm-stable embodiment, in order to be quickly and reliably assembled prior to a storm by one, but certainly by two people.

In summary, an inflatable wind flow body thus provides considerable advantages so that it represents an essential development of the wind flow body according to the invention.

The wind flow body 100 is fixed on a rope 60, has a windward region 102, as well as a leeward region 103.

Figure 4B:
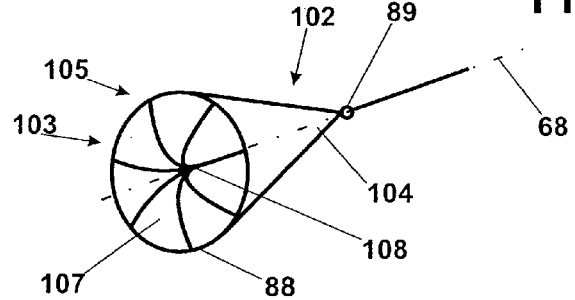

FIG. 4b shows a body 105 with a tip 104, which corresponds to the body of FIG. 4a, whereby its leeward closing surface 107 is retracted against the tip 109 via its center 108, which contributes to the desired formation of turbulence.

Figure 4C:
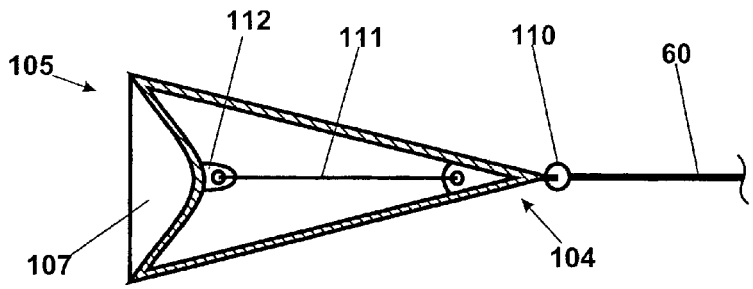

FIG. 4c shows the body 105 in longitudinal section. The rope 60 is fixed on a ring 110, which, in turn, is fastened on the tip 104, whereby a further tension member embodied as a rope 111 is fastened on the inside at the tip 104 via a fastening eye 112 in the center 108, and thus retracts the closing surface 107 against the tip 104.

Such a configuration does not negatively influence the storability of the body 105 in folded together state.

Figure 5:
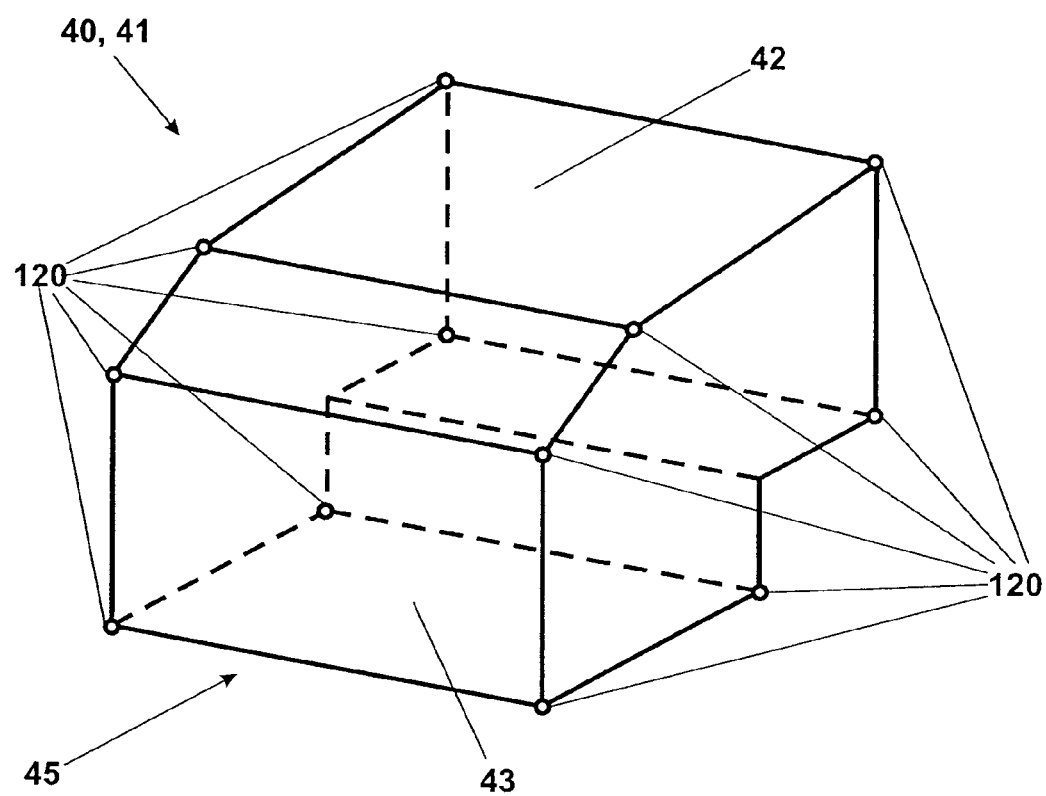
FIG. 5 is a perspective view of an exemplary embodiment of a wind flow body according to the present invention that is attachable to a wall of a structure.

FIG. 5 shows the wind flow body 40, 41 in detail. In addition to the elements shown in FIG. 2b, fastening members of a positioning device embodied as fastening eyes 120, for detachably fixing the body 40, 41 in its operation position relative to the home 1, which is also shown in FIG. 2b (or another structure to be protected). The fixing takes place by means of anchoring or clamping on corresponding counterparts provided on the structure, or also by means of a suitable connection, as it can easily be provided by the person of skill in the art in consideration of the purpose according to the invention.

The fastening eyes 120 furthermore serve the purpose of lacing adjacent wind flow bodies on the body 40, 41 illustrated in the figure, which leads to the configuration of FIG. 2b, according to which all of the walls of the illustrated home 1 can be protected all around and completely by the bodies 40, 41, which are located together side by side.

The ropes 60 of the wind flow bodies 20 or their embodiments (see FIGS. 3a to 3e, for example) can also be fixed to fastening eyes.

This fastening type shares that the wind flow bodies are detachably fixed on the structure in their operating position.

Naturally, the body 40, 41 is also preferably embodied in an inflatable manner, which involves the above-described advantages.

PVC-coated polyester fabrics, for example the fabrics or membranes known per se, which are used for airships, for example, are suitable materials. Materials from which truck tarps are made, which, if applicable, can be made gas-tight by a plastic coating, are also suitable and furthermore highly strainable.

The processing of such materials to a wind flow body according to the invention can be carried out by the person of skill in the art in the context of expert knowledge.

Figure 6A:
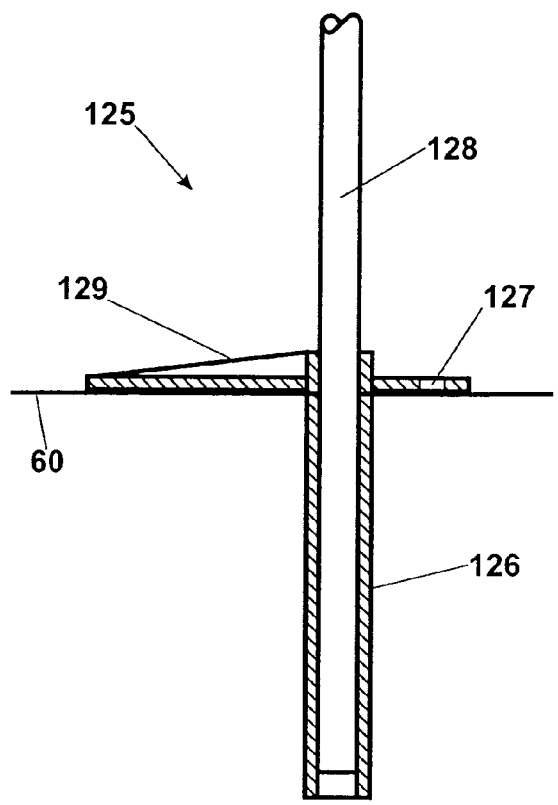
FIG. 6a is a side elevational view of an anchor for fixing a wind flow body in accordance with the present invention relative to the support.

FIG. 6a shows an anchor 125 for the fixing of the wind flow body 40, 41 at the support, which has an anchoring element, which is embodied as an anchor tube 126 embedded therein, on which, in turn, an eyelet 127 is arranged as counterpart to an assigned fastening eye 120.

A clamping element adjusted in the anchor tube by a plug or screw connection and preferably embodied as a glass fiber bar 128 with a length of several meters, serves as holding device for a net, which is not illustrated for unburdening the figure, which can catch debris blown against the home 1 by the storm.

In a preferred exemplary embodiment, a support arm 129 is fastened to the anchor bar 126 in such a manner that it can clamp the glass fiber bar 128 via a clamping rope 130, in order to prevent an uncontrolled movement of the net in the storm.

Figure 6B:
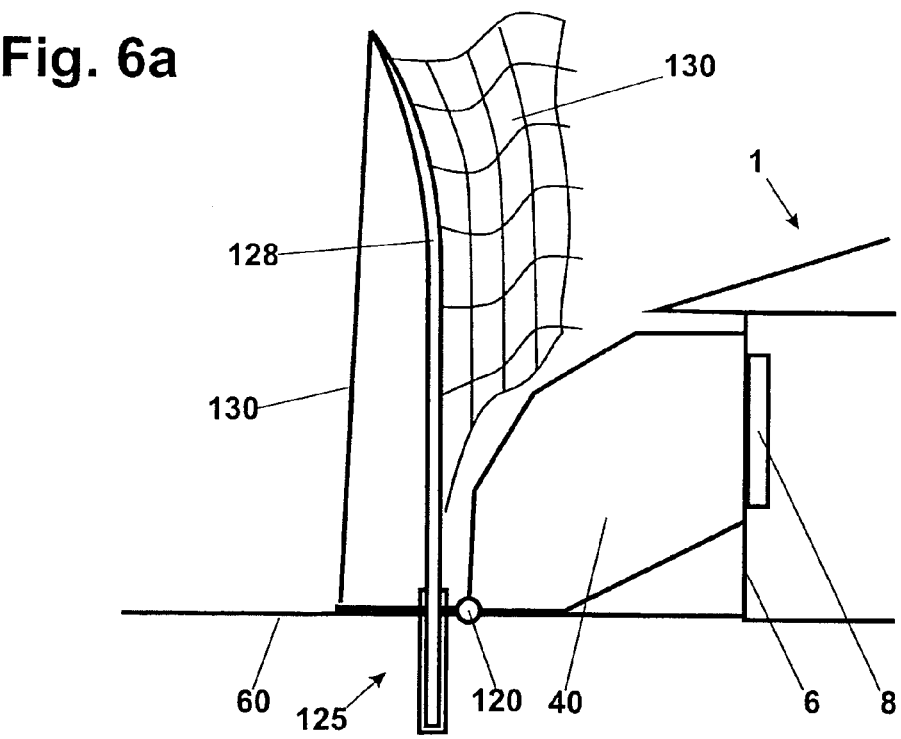
FIG. 6b is a side view of the anchor of FIG. 6a shown positioned next to a home and including one embodiment of a wind flow body in accordance with the present invention attached to the anchor.

FIG. 6b shows the anchor 125 of FIG. 6a, on which a wind flow body 40 is fixed, which, in turn, protects the wall 6 of a home 1. A glass fiber bar 128, which is clamped via a rope 129, is embedded in the anchor 125. A protective net 130, which is only schematically suggested by a fragment, hangs on the glass fiber bar 128.

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A wind flow body for changing heavy wind flow affecting a structure, characterized by a windward region, a leeward region, and a positioning device for removably fixing the body in an operating position relative to a structure, wherein the wind flow body is embodied in an inflatable manner and in such a manner that a heavy wind flow directed from the windward region to the leeward region is changed in a predetermined manner in such a manner that wind flow forces affecting at least a part of the structure are changed, and wherein the wind flow body assumes its operational form in an inflated state.

2. The wind flow body according to claim 1, which is embodied for an all-around flow by a heavy wind, which flows from its windward region to its leeward region.

3. The wind flow body according to claim 2, which is designed to be of low resistance for this flow.

4. The wind flow body according to claim 2, which, in section from the windward region to the leeward region, is embodied in a cone-shaped manner with its tip in the windward region, or in a torpedo-shaped manner, with the head in the windward region.

5. The wind flow body according to claim 2, which is embodied in a rotational-symmetrical manner with a rotation axis embodied extending from the windward region to the leeward region.

6. The wind flow body according to claim 5, including a stalling edge which extends around the leeward region.

7. The wind flow body according to claim 6, which is embodied in a conical manner, whereby the leewardly located foot of the cone has a closing surface, being retracted inwardly against the tip of the cone, so that the leeward region of the cone jacket together with the retracted region of the closing surface forms a stalling edge.

8. The wind flow body according to claim 7, which is embodied in a conical manner, whereby the closing surface is connected with the tip of the cone via a tension member, preferably via the center of the closing surface, whereby this tension member is preferably connected with the positioning device and particularly preferably with the flexible tension member embodied as a rope, arranged thereon.

9. The wind flow body according to claim 2, which is embodied in such a manner that the heavy wind flowing across it from the windward region to the leeward region embodies a turbulence zone downstream behind the leeward region.

10. The wind flow body according to claim 9, which has a stalling edge in the leeward region for forming the turbulence zone.

11. The wind flow body according to claim 1, the positioning device of which has a fastening member arranged in its windward region for preferably one flexible tension member.

12. The wind flow body according to claim 11, whereby the flexible tension member is embodied as a rope.

13. The wind flow body according to claim 1, the leeward region of which is embodied to be fastened to a surface, preferably a wall of a structure and preferably has a surface area, which is suitable for covering windows.

14. The wind flow body according to claim 13, the windward region of which is embodied for deflecting or direction away therefrom heavy wind flow impacting it and being at least partly directed against the leeward region.

15. The wind flow body according to claim 14, the windward region of which is embodied to spin diverted wind flow.

16. The wind flow body according to claim 14, with sidewalls, which connect the windward region and the leeward region, whereby the sidewalls run parallel to one another in such a manner that a plurality of wind flow bodies can be arranged side by side next to one another.

17. The wind flow body according to claim 13, which has a contact surface for supporting the body on a support.

18. The wind flow body according to claim 13, the positioning device of which has at least one fastening member, which is embodied to fix the leeward region on the wall of a structure and/or the contact surface on the support, on which it stands.

19. The wind flow body according to claim 13, which has at least one further fastening member, to operatively arrange thereon at least one further wind flow body.

20. An anchor for fixing a wind flow body according to claim 13 opposite the support, characterized by an anchoring element, which is to be anchored in the support and by a tightening element for a protective net, which is preferably embodied in an elastically deformable manner, which is to be connected to the anchoring element.

21. The anchor according to claim 20, whereby the tightening element is embodied in a rod-shaped manner and can with one end be connected into, preferably inserted into and/or screwed into the anchoring element, which is correspondingly embodied in an opposite manner.

22. The anchor according to claim 20, whereby the anchoring element has a laterally projecting arm, via which the clamping element can be loosened in operating position for storage stabilization.

23. A structure with a roof, which may be susceptible to a carrier wing effect which, during heavy wind flow, endangers the structure, characterized in that at least one wind flow body for changing heavy wind flow affecting the structure includes a windward region, a leeward region, and a positioning device for removably fixing the wind flow body in an operating position relative to the structure, wherein the wind flow body is embodied in an inflatable manner and arranged in such a manner opposite the roof that a heavy wind flow directed from the windward region to the leeward region is changed in a predetermined manner so that a carrier wing effect can be at least partially reduced or prevented during heavy wind flow, and wherein the wind flow body assumes its operational form in an inflated state.

24. The structure according to claim 23, where the wind flow body is arranged in such a manner opposite the roof such that a created turbulence zone reduces the region of laminar flow in a predetermined manner.

25. The structure according to claim 23 including at least one wall, characterized in that the wind flow body across which wind flows is arranged wherein the windward region of is embodied for deflecting heavy wind flow from impacting the wall and being at least partly directed against the leeward region in such a manner that, with a heavy wind flow directed against the wall, the dynamic pressure created thereby is reduced.

26. The structure according to claim 25, wherein at least one further wind flow body is provided, which is arranged in such a manner opposite the roof that the wind deflected from the wind flow body, across which wind flows, flows around the wind flow body and is thus spun around.

* * * * *